A. L. PALMER.
KITCHEN UTENSIL.
APPLICATION FILED MAY 8, 1913.
1,100,489.
Patented June 16, 1914.
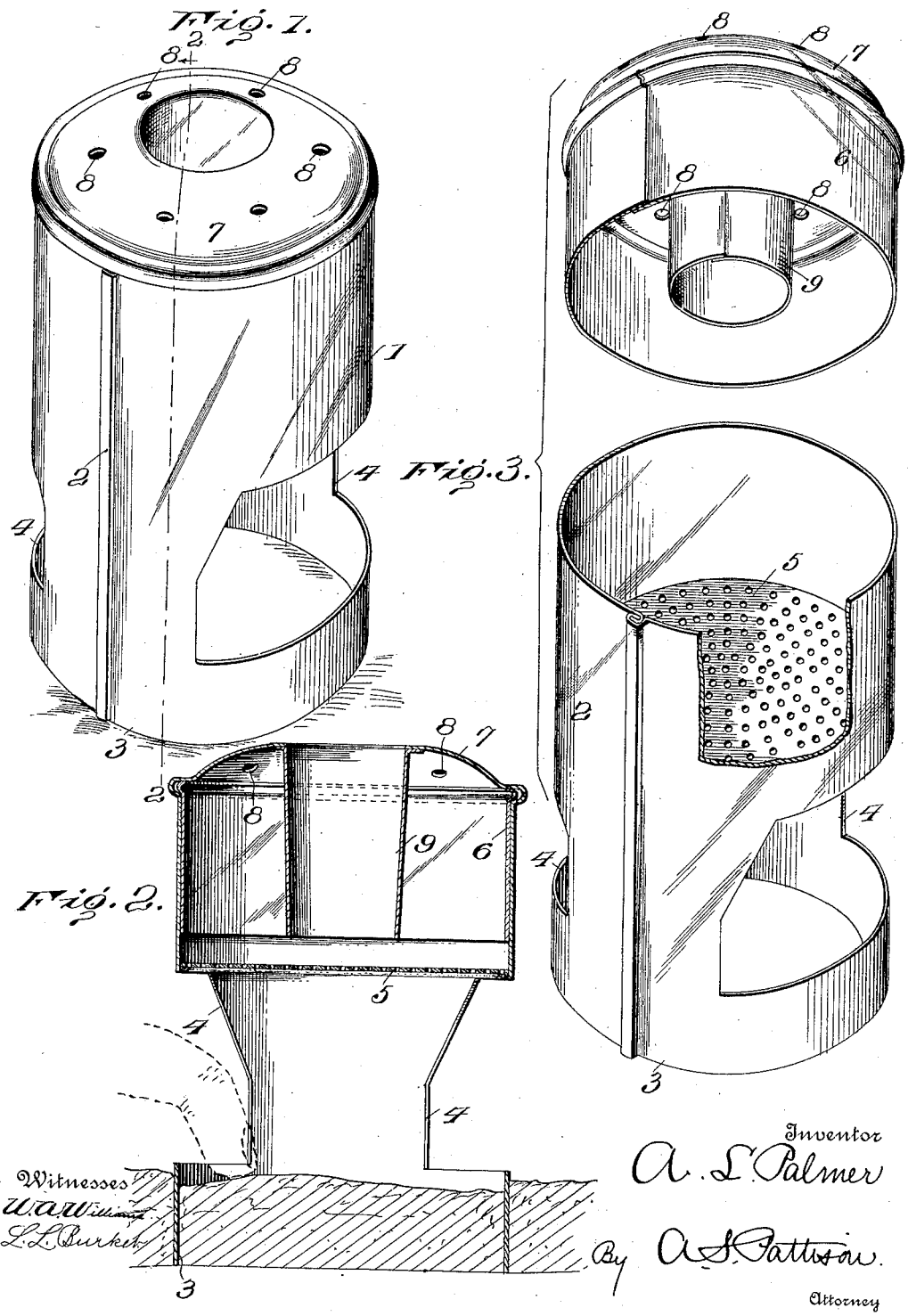
Inventor
A. L. Palmer
By A. S. Pattison.
Attorney
Witnesses
W. A. Williams
L. L. Burket

UNITED STATES PATENT OFFICE.

ARTHUR L. PALMER, OF CHENANGO FORKS, NEW YORK.

KITCHEN UTENSIL.

1,100,489. Specification of Letters Patent. Patented June 16, 1914.

Application filed May 8, 1913. Serial No. 766,394.

*To all whom it may concern:*

Be it known that I, ARTHUR L. PALMER, a citizen of the United States, residing at Chenango Forks, in the county of Broome and State of New York, have invented certain new and useful Improvements in Kitchen Utensils, of which the following is a specification, reference being had therein to the accompanying drawing.

My invention relates to improvements in kitchen utensils, the primary object of which is to assemble in a simple and practical manner several useful kitchen utensils into one article, thereby lessening the expense of separate utensils.

Another object of my invention is to so assemble the different kitchen utensils into one structure that in operation any one of the utensils may be used in an easy manner and be in no way hampered by the other utensils which are present in the one article.

It has long been apparent that the assembling of several utensils into one is of great advantage, for the reason that it overcomes the necessity of having all of the different utensils at hand and also a saving in time over the method of first using one utensil and then the other.

In the accompanying drawing—Figure 1 is a perspective view of my improved utensil. Fig. 2 is a sectional view taken along the line 1—1 of Fig. 1. Fig. 3 is a perspective view of my improved utensil showing a portion thereof in separated relation.

In the accompanying drawing, in which like reference numerals designate similar parts, 1 is a body portion of my utensil formed of a sheet of metal rolled into cylindrical form and having its edges overlapped and soldered, as shown at 2. The lower edge 3 may be used to cut out biscuits, cakes, etc., and in order that the biscuit or cake may be more easily removed, I provide that portions 4 should be cut out of the opposite sides of the body-portion 1, so that by pushing on the upper surface of the cake or biscuit through the opening 4 it may be easily removed, as clearly shown in Fig. 2.

Within the cylindrical body-portion 1, I provide a perforated plate or screen 5, which is soldered to the inner surface of the body-portion 1 and at right angles thereto just above the cut-away portions 4. This screen may be used as a strainer, colander, or flour sifter. In using the screen 5 as a flour sifter, the entire upper portion of the body 1 may be filled with flour and in cutting a biscuit or cake with the lower edge 3, flour is simultaneously sifted through on top of the biscuit, cake, etc.

Fitting within the upper end of the body-portion 1, I provide a tubular member 6 having a rounded or dome-shaped top 7, soldered thereto, the said dome 7 having perforations 8. The tubular member 6 is of a length less than the distance between the top edge of the body-portion 1 and the screen 5. Within the tubular member 6, I provide a graduated tubular portion 9 of a relatively small cross-section which extends the entire length of the tubular member and terminates on the outer surface of the dome-shaped top 7 and is soldered thereto, as shown at 10. The wider end of the graduated tubular portion 9 is soldered at 10 and the narrower end remains flush with the edge of the tubular member. This tubular member 6, together with the graduated tubular portion 9, may be used to cut out doughnuts, cakes, etc., and by virtue of the perforations 8 in the dome-shaped cover 7, all suction is removed from within the tubular member 6, and consequently, the doughnut or cake, etc., may be easily removed.

The lower edge of the body-portion 1 is adapted to chop up potatoes or other food stuffs and the chopped pieces may overflow or be forced out through the cut-away portions 4 in opposite sides of the body portion 1.

Having thus described my invention, what I claim and desire to secure by Letters Patent is:

1. A utensil comprising a body portion having oppositely arranged cut-away portions intermediate its ends, a perforated plate within the said body portion extending transverse the sides thereof, above the top edge of the cut-away portion, and a cover fitting within the said body portion.

2. A utensil comprising a cylindrical body portion having oppositely arranged cut-away portions intermediate its ends, a perforated plate within the said body portion extending transverse the sides thereof, and above the cut-away portion and a cup-shaped cover fitting within the said body portion and of a length less than the distance between the top edge of the body portion and the perforated plate.

3. A utensil comprising a cylindrical body portion, a cup-shaped cover fitting within said body portion, and having perforations in the top thereon and a tubular open ended member carried by and depending from the top of the cover and the lower end of the said tubular member in alinement with the lower edge of the cover.

4. A utensil comprising a cylindrical body portion having oppositely arranged cut-away portions intermediate its ends, a perforated plate within said body portion, extending transverse the sides thereof, and above the cut-away portions, a cup-shaped cover having perforations in its top and fitting within the said body portion, a tubular open ended member depending from the top of said cover and having its lower end flush with the lower edge of the cover, said cup-shaped cover of a length less than the distance between the upper edge of the body portion and the perforated plate.

5. A utensil comprising an elongated cylindrical body portion having oppositely arranged cut-away portions adjacent its lower end, a perforated plate within said body portion extending transverse the sides thereof above the cut-away portions and forming a receptacle in the upper end of the body portion, and a cup-shaped cover fitting within the upper end of the body portion, and having a tubular open-ended member depending from the top of said member, and having its lower end flush with the lower end of the cover, the said cover of a length less than the distance between the perforated plate and the upper end of the body portion, whereby said tubular member is spaced from said perforated plate for the purpose described.

In testimony whereof I hereunto affix my signature in the presence of two witnesses.

ARTHUR L. PALMER.

Witnesses:
CARL E. PALMER,
JOHN THOMAS.

---

Copies of this patent may be obtained for five cents each, by addressing the "Commissioner of Patents, Washington, D. C."